J. WARDER.
CHUCK.
APPLICATION FILED SEPT. 28, 1918.
1,356,574.
Patented Oct. 26, 1920.
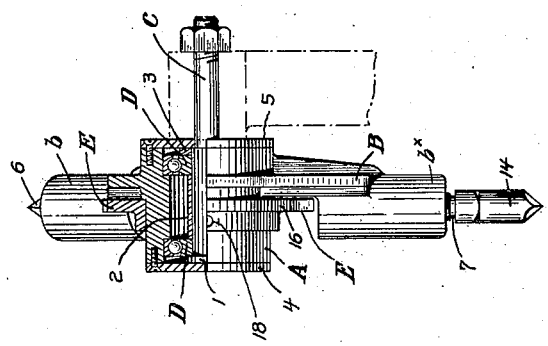
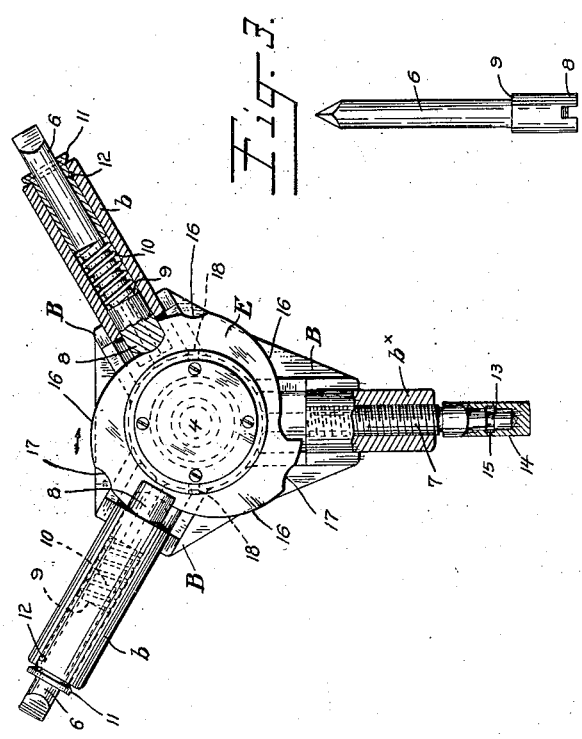
Inventor.
Joseph Warder,
By his Attorney.
Ernest Hopkinson

UNITED STATES PATENT OFFICE.

JOSEPH WARDER, OF WALKERVILLE, ONTARIO, CANADA, ASSIGNOR TO MORGAN & WRIGHT, A CORPORATION OF MICHIGAN.

CHUCK.

1,356,574. Specification of Letters Patent. Patented Oct. 26, 1920.

Application filed September 28, 1918. Serial No. 256,048.

*To all whom it may concern:*

Be it known that I, JOSEPH WARDER, a subject of the King of Great Britain, residing at Walkerville, county of Essex, and Province of Ontario, Canada, have invented certain new and useful Improvements in Chucks, of which the following is a full, clear, and exact description.

This invention relates to improvements in chucks, and more particularly to chucks adapted for use in connection with the manufacture of motor vehicle tires. The object of the invention is to provide a quick acting chuck of simple construction and adapted for use with tire cores of wide range in diameter.

The invention will be understood by reference to the accompanying drawings, in which—

Figure 1 is a sectional elevation of a chuck constructed in accordance with the invention;

Fig. 2 is a sectional plan view of the same; and

Fig. 3 is a detail view of one of the expansion bars 6.

The chuck comprises a hub A and three arms B radially projecting therefrom, each arm being formed with a tubular member $b$, $b^\times$, to receive an expansion bar. The hub of the chuck is rotatably supported on a shaft C by means of two bearing rings D, the hub being held in position by means of a shoulder 1 formed on shaft C, the spacing rings 2 and 3 surrounding the shaft, and the end plates 4 and 5.

Disposed within the tubular members $b$ are the expansion bars 6, each bar being formed with a fork 8 at its lower end to straddle a cam disk E. Within the tubular member $b^\times$ is threaded an expansion bar 7 which is adapted for endwise adjustment. Each bar 6 is tapered at its outer end to fit within the usual groove formed in the ring core upon which a tire is built. The bars 6 are each reduced above the forked portion 8 so as to provide a shoulder 9 against which bears one end of a coiled spring 10. At its opposite end the spring engages a bushing 11 locked within the tubular member by means of a pin 12. The bar 7 is reduced near its outer end so as to receive a sleeve or cap 14 which is tapered at its outer end. The reduced portion of bar 7 is formed with an annular channel in register with a similar channel formed in the cap. A semicircular spring 15 disposed within these channels will serve to maintain the cap in position on the bar. By this arrangement, the bar may be rotated relatively to the cap 14, and thus its effective length may be adjusted while a core is mounted upon the chuck.

The cam surfaces of disk E which act upon the expansion bars 6 are indicated by the numeral 16. When the disk is turned in the direction of the arrow, Fig. 1, each bar 6 will be forced outwardly against the pressure of its spring until it comes into register with and moves into a seat 17 formed in the cam. The disk may be turned by means of a usual form of spanner wrench, sockets 18 being formed in the disk to receive the engaging members of said wrench.

The provision of the endwise adjustable expansion bar 7 greatly increases the range of the device without destroying its simplicity of form and operation. By adjusting the effective length of the bar 7, the device may readily be adapted for ring cores of greater or less diameter, and this without affecting the short, securing and releasing movements of the bars 6.

Having thus described my invention what I claim and desire to protect by Letters Patent is:—

1. A chuck, comprising, in combination, a support, a cam disk rotatably mounted on said support, a plurality of expansion bars maintained in operative relation with said disk, and an endwise adjustable expansion-bar held out of operative relation with said disk.

2. In a chuck, a cam disk, a bracket formed with a hub and a series of arms projecting radially from the latter, each arm being provided with a tubular portion spaced from the disk, the latter being rotatable upon the hub, a plurality of expansion bars, each bar being disposed within the tubular portion of one of said arms, means for resiliently maintaining said bars in contact with the disk, and an endwise adjustable expansion bar in one of said tubular portions out of operative relation with said disk.

3. In a chuck, a bracket formed with a hub and a plurality of tubular arms projecting radially from the latter, spring-retracted expansion-bars each disposed in one of the tubular arms, a disk rotatable upon said hub and having cam surfaces engaging said bars, and an expansion bar threaded in one of said arms for longitudinal adjustment.

4. A chuck, comprising a rotatable support, a plurality of radially movable expansion bars mounted on said support, a rotatable cam mounted on the support having a plurality of radial projections adapted to engage the expansion members to move them into work engaging positions, and an endwise adjustable expansion bar held out of operative relation with said cam.

Signed at Detroit, county of Wayne, State of Michigan, this 21st day of August, 1918.

JOSEPH WARDER.